United States Patent

Reason et al.

[19]

[11] Patent Number: 6,058,716
[45] Date of Patent: May 9, 2000

[54] PERISHABLE PRODUCT PROTECTION CONTROL SYSTEM

[75] Inventors: John Reason, Manlius; Mark Fragnito, Cicero, both of N.Y.; Mead Rusert, Athens, Ga.

[73] Assignee: Carrier Corporation, Syracuse, N.Y.

[21] Appl. No.: 09/220,537

[22] Filed: Dec. 24, 1998

[51] Int. Cl.[7] ............................ F25D 17/00; G05D 15/00
[52] U.S. Cl. ................ 62/89; 62/178; 236/78 D
[58] Field of Search ................ 62/89, 178, 186, 62/229, 209; 236/78 D, 98 B

[56] References Cited

U.S. PATENT DOCUMENTS 5,172,560  12/1992  Jurewicz et al. .................. 62/229 X
5,295,364   3/1994  Truckenbrod et al. ............. 62/209
5,634,347   6/1997  Hanson et al. ..................... 62/229 X Primary Examiner—William Wayner
Attorney, Agent, or Firm—Bryan D. Rockwell

[57] ABSTRACT

A method of controlling supply air temperature in an enclosure refrigerated with a refrigeration cycle including an evaporator exhibiting a temperature differential, is disclosed. The method includes the steps of defining a supply temperature limit constant and a setpoint; sensing supply air temperature; sensing return air temperature; comparing supply air temperature to the supply temperature limit constant; increasing supply air temperature if supply air temperature drops below the constant and at least one of additional determinable factors is sensed, thereby reducing cooling capacity; and increasing cooling capacity without substantially effecting the temperature differential at the evaporator.

9 Claims, 2 Drawing Sheets

2

PERISHABLE PRODUCT PROTECTION CONTROL SYSTEM

TECHNICAL FIELD

This invention is directed to refrigeration of perishables being transported, and more particularly, to a control system for use with a transport refrigeration unit for controlling supply air temperature to prevent top-freezing of perishables, while selectively maintaining overall refrigeration system cooling capacity.

BACKGROUND ART

Perishable products are often transported from one point to another in refrigerated trucks, trailers or the like. For certain perishables, it is desirable to maintain them in a cold but unfrozen state, substantially around 32° F. Factors such as the temperature of outside air, the starting temperature of the perishable, and the capacity of the refrigeration system effect the ability and speed of the transportation unit in maintaining the perishable at the desired set point temperature. Accordingly, it is frequently desirable to reach the setpoint temperature, which is typically at or around 32° F., by pulling down the temperature in the trailer below the set point. However, an undesirable result of such a process is the top freezing of perishable goods, as the supply duct is typically positioned toward the ceiling of the refrigerated trailer, over the goods. As a result, the top portions of the perishable products may be frozen while the underlying products are maintained at the desired setpoint temperature.

A known method for substantially preventing top-freezing includes the use of a control system which senses supply air temperature to determine if the same is detected to have fallen below a pre-selected floor temperature which represents the safety threshold for preventing product damage. Based on a methodology including consideration of the supply air temperature, return air temperature, and the setpoint temperature, and other determinable factors, such as time for top freezing to occur and desired rate of pull-down, the temperature differential between the supply air and the setpoint temperature can be adjusted to achieve the desired results. However, one negative result of such temperature differential adjustments is a reduced capacity of the refrigeration system in cooling the perishable products, leading to the necessity for once again substantially decreasing the supply air, providing a highly fluctuating system temperature profile. While this system is effective in preventing top-freezing, the lack of a more direct capacity control function prevents achievement of a more stable temperature profile.

There exists a need, therefore, for a control system for a transport refrigeration unit, having an additional capacity control function, which prevents top-freezing and allows for stable system temperature control.

DISCLOSURE OF INVENTION

The primary object of this invention is to provide an improved control system for a transport refrigeration unit for preventing top-freezing of perishable products, while maintaining the desired capacity level of the system.

Another object of this invention is to provide an improved control method for preventing top-freezing of perishable products, by controlling temperature differential between supply air temperature and supply air temperature "low limit" (supply limit constant), and also supply air temperature and return air temperature, based on a plurality of determinable factors, while also controlling system capacity to a desired level.

Still another object of this invention is to provide an improved control method for use with a transport refrigeration unit for preventing top-freezing of perishable products through use of a control integration term which considers various factors in adjusting supply air temperature for preventing top-freezing.

The foregoing objects and advantages discussed herein are achieved by the method of present invention for controlling supply air temperature in an enclosure refrigerated with a refrigeration cycle including an evaporator exhibiting a temperature differential. The method includes the steps of defining a supply temperature limit constant and a setpoint; sensing supply air temperature; sensing return air temperature; comparing supply air temperature to the supply temperature limit constant; increasing supply air temperature if supply air temperature drops below the constant and at least one of additional determinable factors is sensed, thereby reducing cooling capacity; and increasing cooling capacity without substantially effecting the temperature differential at the evaporator.

BEST MODE FOR CARRYING OUT THE INVENTION

Figure 1:
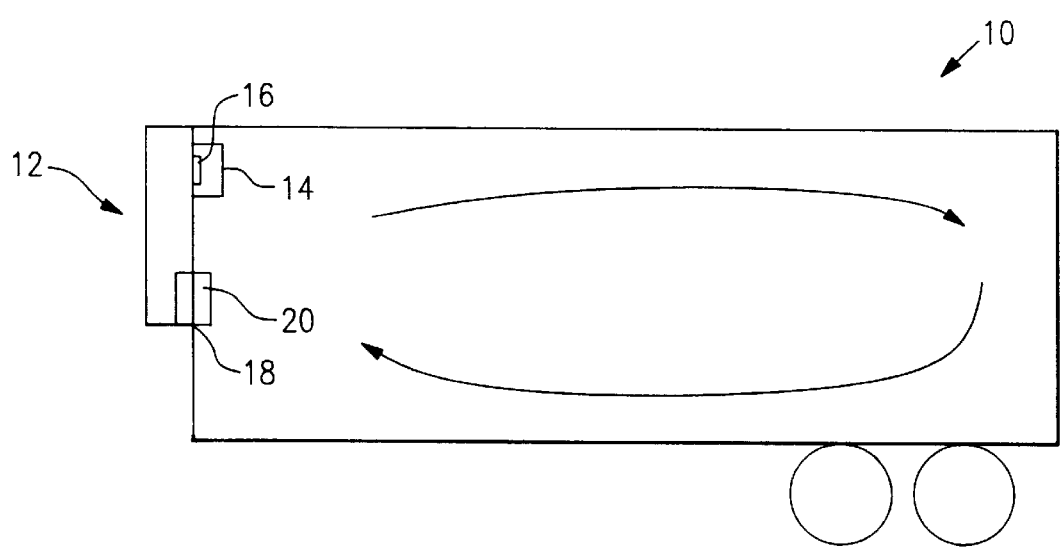
FIG. 1 is a schematic representation of a refrigerated truck/trailer unit including the refrigeration system, a supply air duct and temperature probe, a return air duct and temperature probe and perishable product.

Referring now to the drawings in detail, there is shown in FIG. 1, a schematic diagram of a refrigerated transport trailer for carrying perishable products, designated generally as 10. The trailer includes a refrigeration system 12, a supply air duct 14, a supply air temperature probe 16, a return air duct 18, and a return air temperature probe 20. Perishable product P is also shown in FIG. 1. Refrigeration system 12 has a typical refrigeration cycle, as known in the art, and supplies cold air discharged through supply air duct 14 while warmer air is returned to the refrigeration unit through the return air duct 20. Temperature probe 16 is used to sense temperature of air being discharged at the supply air duct and temperature probe 18 is used to sense temperature of air returning to the refrigeration unit at the return air duct 20.

The process of the present invention is dependent upon a refrigeration system using two temperature probes, the supply air temperature probe 16 and the return air temperature probe 20. In addition, for the method of the present invention to be implemented, the desired setpoint temperature for the air temperature in the refrigerated enclosure must be greater than or equal to 32° F., such that freezing of the perishable products is not the goal. Also, the system must be operating in a cooling mode as opposed to a heating or defrost mode. When the setpoint temperature refrigeration is set below 32° F., the process of the present invention is not used and a default system/method is invoked.

Figure 2:
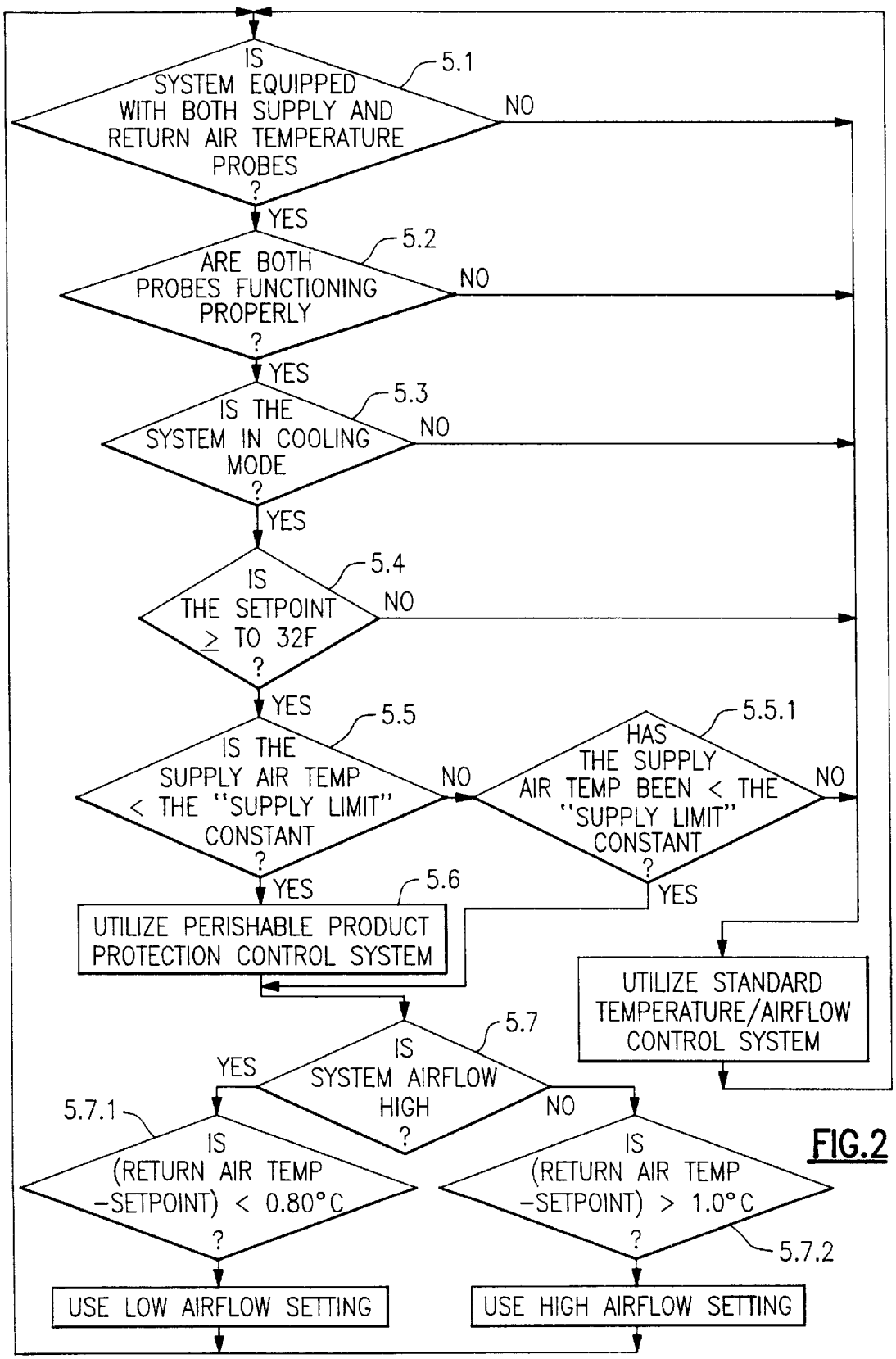
FIG. 2 is a flow chart representing the control steps of the control method of the present invention.

Referring to FIG. 2, to begin the process, in Step S.1, the method checks whether the refrigeration system is equipped with both a supply and a return air temperature probe. If yes, the method continues, if no, the process defaults to a standard temperature/air flow control system known in the art and not herein described. In Step S.2 the process checks whether the probes are functioning properly, if yes, the process continues, if no, the process again defaults to the standard control system. In Step S.3, the process checks if the system is in the cooling mode. If yes, the process continues, if no, the process again defaults to the standard control system. In Step S.4, the process checks whether the set point is set at greater than or equal to 32° F., if yes, the process continues, if no, the process again defaults to the standard control system. In Step S.5, the process checks whether the supply air temperature (SAT) is less than the Supply Limit Constant (SLC), a temperature constant selected in accordance with the desired system functionality as the supply air low temperature safety threshold. If SAT is not less than SLC, in Step S.5.1, the process checks if it has been less than SLC. If not, the process defaults to the standard control system. If SAT is not currently but has been less that SLC, the process skips Step S.6 and moves to Step S.7 to adjust system capacity. In this scenario, the control system of Step S.6 has already adjusted SAT relative SLC, as described below, and now capacity may need readjustment in Steps S.7.

In Step S.6, the SAT is less than the supply limit constant, so the perishable product protection control method of the present invention is implemented, whereby this process affects the overall temperature control of the entire refrigeration system.

In implementing the process, the system utilizes a control algorithm which evaluates system temperature based on the following set of equations.

System Control Error=Mode Selection Probe Error+Control Integration Term (CIT)

Mode Selection Probe Error=Setpoint−Mode Selection Probe Temperature $CIT_n$=(Kr*(setpoint−selected control probe temperature))+ (Ks*(supply limit constant−supply probe temperature))+$CIT_{n-1}$ The system control error will determine the cooling (or heating) capacity required of the refrigeration system. Typically, the mode selection probe is the SAT probe which is the determining factor in whether the system mode is either cooling or heating, and the selected control probe is the return air temperature probe which senses the temperature which the system desires to be equal to the setpoint. A system controlled in this fashion regulates the SAT (either increases or decreases it) in order to have the return air temperature achieve equality with the setpoint.

Under normal conditions the control integration term (CIT) is an accumulating quantity based on a fractional difference between the setpoint and selected control probe temperature (return air temperature). The magnitude of this fractional difference is controlled by the size of constant Kr. The CIT is then added to the mode selection probe error, thus influencing this quantity in a direction (either increasing or decreasing) which will ultimately cause the system to regulate the SAT accordingly (various levels of either cooling or heating) to achieve equality between the setpoint and the selected control probe (return air probe).

In step S.6, the bolded portion of the CIT is introduced when the SAT is detected less than the (SLC). This bolded term is a fractional difference between the SLC and SAT. The magnitude of this quantity is controlled by the size of constant Ks. This quantity is opposite in polarity to the original portion of the CIT discussed above. Once this portion of the equation is introduced, the CIT will begin to accumulate in the opposite direction, thus forcing the refrigeration system to cause a warming of the SAT. By "tuning" the ratio of Kr to Ks, the desired system stability can be achieved.

CIT only includes the "reversal" term (bolded) when the Supply Temperature dips below the SLC. Normally CIT is used without the "reversal" term to force the control system to lower the SAT to attempt to cool the product. As indicated by the control integration term equation, for each iteration through the process, $CIT_n$ includes the CIT term from the previous calculation, $CIT_{n-1}$. Accordingly, the process allows the accumulation of the control integration term, $CIT_n$ which is entered into the control system and used to regulate the SAT. Step S6 is indicative of the supply temperature getting too low and encroaching upon potential top-freezing. Thus the addition of the "reversal" term reverses the quantity CIT and thus the temperature of the supply air will be driven upwardly to reduce the temperature differential to prevent top-freezing of the perishable products.

Ks and Kr as indicated, are pre-selected constants and typically the ratio between Ks to Kr is 2:1. This may be adjusted such that the reversal effect by the control integration term can be controlled to achieve the desired system capability. The SLC is typically a predetermined constant temperature. However, the process is not controlled by this constant supply temperature since reversal and raising of the SAT is controlled by the control integration term which takes into consideration various factors including the multipliers Kr and Ks. As a result, the response by the process to the system is typically a sinusoidal temperature response, maintaining the actual SAT in a narrow band around the predetermined SLC. Such a response provides the benefit of allowing for faster temperature pulldown, since the actual SAT is allowed to fall substantially below the SLC before a reversal is required due to the potential for top-freezing. Once CIT accumulates to a certain level as programmed into the controller, actual SAT is raised, thereby lessening the temperature differential at the evaporator. However, because the temperature differential at the evaporator is lessened to prevent top freezing, based on the capacity defined by the equation BTU=1.08×CFM×ΔT, the capacity is adversely affected.

To offset capacity loss by the lowering of ΔT at the evaporator, the process of the present invention adjusts air flow, represented by the CFM factor in the capacity equation. Accordingly, with an increase in CFM or air flow to offset the decrease in ΔT, capacity can be retained or returned to the desired level.

Referring to Step S.7, the process of the present invention determines if the system air flow is high. If based on preset factors, the control determines that the air flow setting is high, in Step S.7.1, the process determines if the return air temperature and Setpoint differential is less than a preset temperature differential, preferably 0.80° C. If the differential is less than this preset number, the low air flow setting is used. However, if it is not less than this number, a high air flow setting is maintained. If initially in step S.7 the system air flow is determined as not high, in sub-step S.7.2, the process determines if the return air temperature and set point differential is greater than another preset differential, preferably 1° C. If this is not the case, a high air flow setting is switched to in order to increase capacity and offset the lower temperature differential. The increased air flow allows greater system capacity at the same temperature differential across the evaporator coil (return air temp−supply air temp.). Thus the perishable product protection control system will limit the SAT to avoid product freeze damage, yet will increase air flow to restore capacity lost by limiting the temperature differential across the evaporator coil.

The process of the present invention functions on a continuous basis to constantly monitor and adjust the SAT and capacity in accordance with the process set forth above, to avoid the risk of top-freezing to perishable commodities while at the time minimizing the capacity loss of the system.

The primary advantage of this invention is that an improved control system for a transport refrigeration unit is provided for preventing top-freezing of perishable products, while maintaining the desired capacity level of the system. Another advantage of this invention is that an improved control method for a transport refrigeration unit is provided for preventing top-freezing of perishable products, by controlling temperature differentials between SAT and a pre-programmed supply limit constant, and the SAT and the return air temperature, based on a plurality of determinable factors, while also controlling system capacity to a desired level. Still another advantage of this invention is that an improved control method for a transport refrigeration unit is provided for preventing top-freezing of perishable products through use of a control integration term which considers various factors in adjusting SAT for preventing top-freezing.

Although the invention has been shown and described with respect to the best mode embodiment thereof, it should be understood by those skilled in the art that the foregoing and various other changes, omissions, and additions in the form and detail thereof may be made without departing from the spirit and scope of the invention.

What is claimed is:

1. A method of controlling supply air temperature in an enclosure refrigerated with a refrigeration cycle including an evaporator exhibiting a temperature differential, comprising the steps of:

defining a supply temperature limit constant and a setpoint temperature;

sensing supply air temperature;

sensing return air temperature;

comparing supply air temperature to said supply temperature limit constant;

increasing supply air temperature if supply air temperature drops below said constant and at least one of additional determinable factors is sensed, thereby reducing cooling capacity; and increasing cooling capacity without substantially effecting the temperature differential at the evaporator.

2. The method according to claim 1, wherein said step of increasing cooling capacity comprises the step of increasing the flow rate of supply air.

3. The method according to claim 2, wherein said step of increasing cooling capacity comprises one of the steps of setting supply air flow rate to a high setting if said return air temperature is at a first differential relative said setpoint and setting supply air flow rate to a low setting if return air temperature is at a second differential relative said setpoint.

4. The method according to claim 1, wherein said additional determinable factors include the value of a control integration term having multiplier constants, wherein said step of increasing supply air temperature includes determining the control integration term and monitoring the control integration term such that if the control integration term reaches a predetermined value, said supply air temperature is increased.

5. The method according to claim 4, wherein said step of increasing further includes the step of setting the ratios between the multiplier constants.

6. The method according to claim 4, including the step of performing said step of determining on a rolling basis such that each subsequent control integration term one of obtains and loses value from the addition of the preceding control integration term.

7. The method according to claim 5, including the step of comparing said control integration term to the predetermined value and adjusting said supply temperature based on results of said step of comparing.

8. The method according to claim 4, wherein said step of increasing cooling capacity comprises the step of increasing the flow rate of supply air.

9. The method according to claim 8, wherein said step of increasing cooling capacity comprises one of the steps of setting supply air flow rate to a high setting if said return air temperature is at a first differential relative said setpoint and setting supply air flow rate to a low setting if return air temperature is at a second differential relative said setpoint.

* * * * *